(12) United States Patent
Okuno et al.

(10) Patent No.: US 9,189,693 B2
(45) Date of Patent: Nov. 17, 2015

(54) INFORMATION PROCESSING APPARATUS AND INFORMATION PROCESSING METHOD

(71) Applicant: CANON KABUSHIKI KAISHA, Tokyo (JP)

(72) Inventors: Yasuhiro Okuno, Tokyo (JP); Yusuke Mitarai, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 289 days.

(21) Appl. No.: 13/687,629

(22) Filed: Nov. 28, 2012

(65) Prior Publication Data

US 2013/0142430 A1    Jun. 6, 2013

(30) Foreign Application Priority Data

Dec. 6, 2011  (JP) .................................. 2011-267256

(51) Int. Cl.
  *G06K 9/18*  (2006.01)
  *G06K 9/62*  (2006.01)
(52) U.S. Cl.
  CPC ................ *G06K 9/18* (2013.01); *G06K 9/6202* (2013.01); *G06K 9/6282* (2013.01)
(58) Field of Classification Search
  None
  See application file for complete search history.

(56) References Cited

U.S. PATENT DOCUMENTS

| | | | |
|---|---|---|---|
| 6,560,359 B2* | 5/2003 | Yoshii ........................... | 382/173 |
| 7,577,297 B2 | 8/2009 | Mori et al. | |
| 7,881,524 B2 | 2/2011 | Matsugu et al. | |
| 8,209,172 B2 | 6/2012 | Mitarai et al. | |
| 8,340,439 B2 | 12/2012 | Mitarai et al. | |
| 2006/0115157 A1 | 6/2006 | Mori et al. | |
| 2009/0089235 A1 | 4/2009 | Torii et al. | |
| 2012/0045120 A1 | 2/2012 | Tate et al. | |
| 2012/0057791 A1 | 3/2012 | Mitarai et al. | |
| 2013/0129219 A1* | 5/2013 | Takenouchi et al. .......... | 382/182 |
| 2014/0112571 A1* | 4/2014 | Viera et al. .................... | 382/138 |
| 2014/0147053 A1* | 5/2014 | Boncyk et al. ................ | 382/218 |

FOREIGN PATENT DOCUMENTS

JP  2742192 B2  4/1998
JP  3367170 B2  1/2003

OTHER PUBLICATIONS

Ozuysal et al., "Fast Keypoint Recognition in Ten Lines of Code", cvpr, IEEE Conference on Computer Vision and Pattern Recognition, 2007, pp. 1-8.

* cited by examiner

*Primary Examiner* — Vikkram Bali
(74) *Attorney, Agent, or Firm* — Fitzpatrick, Cella, Harper & Scinto

(57) ABSTRACT

An information processing apparatus encodes an input pattern to a code including a plurality of bits, calculates reliabilities for respective bits of the code, generates a similar codes each similar to the code based on the reliabilities, and recognizes the input pattern based on the code and the similar codes.

12 Claims, 13 Drawing Sheets

FIG. 3

| | x1 | y1 | x2 | y2 |
|---|---|---|---|---|
| | x1(1) | y1(1) | x2(1) | y2(1) |
| | x1(2) | y1(2) | x2(2) | y2(2) |
| Nb | x1(3) | y1(3) | x2(3) | y2(3) |
| | x1(4) | y1(4) | x2(4) | y2(4) |
| | ..... | ..... | ..... | ..... |
| | x1(Nb) | y1(Nb) | x2(Nb) | y2(Nb) |

FIG. 4

| 401<br>BINARY CODE | 402<br>PATTERN IDENTIFIER | |
|---|---|---|
| 00010101 | 000001 | |
| 10010110 | 000002 | |
| ~ | ~ | Nid |
| 11000110 | Nid-1 | |
| 11110010 | Nid | |

Nb BITS

F I G. 6
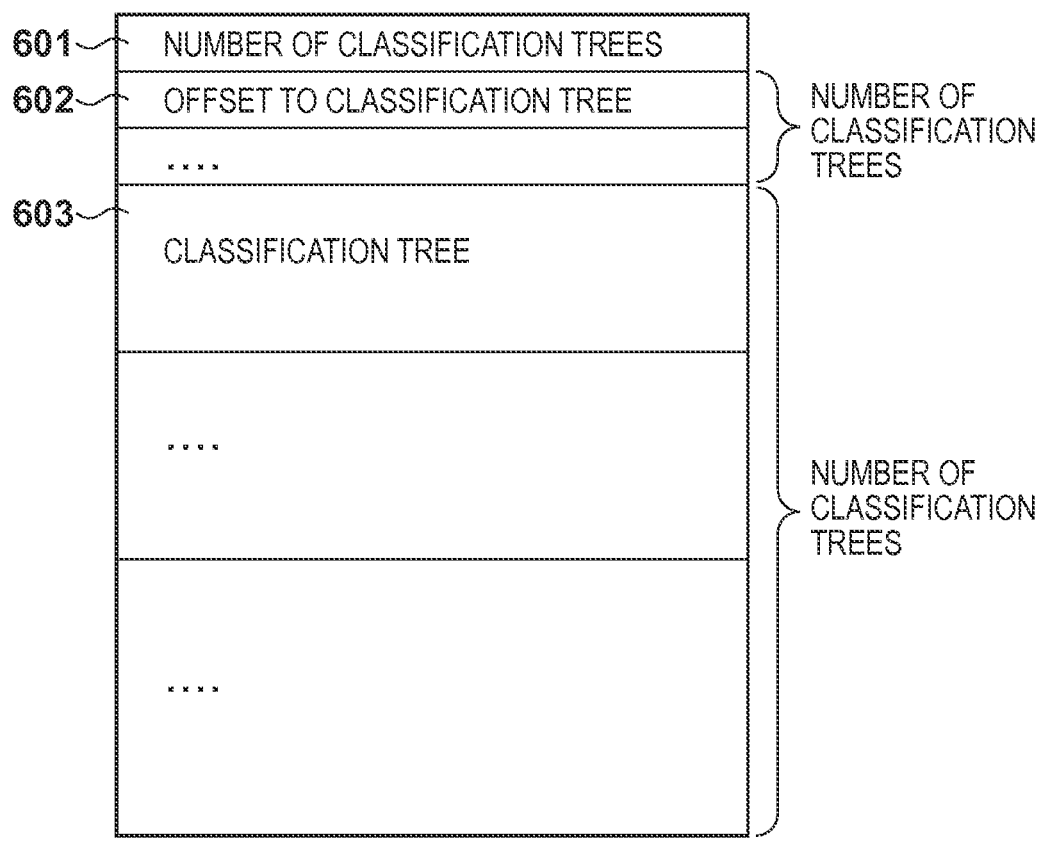

FIG. 12

| BIT NUMBER | 1 | 2 | 3 | ... | Nb |
|---|---|---|---|---|---|
| RELIABILITY VALUE | $C_1$ | $C_2$ | $C_3$ | ... | $C_{Nb}$ |

1201 (top), 1202 (bottom)

FIG. 13

| PATTERN IDENTIFIER (1301) | RECOGNITION SCORE (1302) |
|---|---|
| .... | .... |
| .... | .... |
| .... | .... |

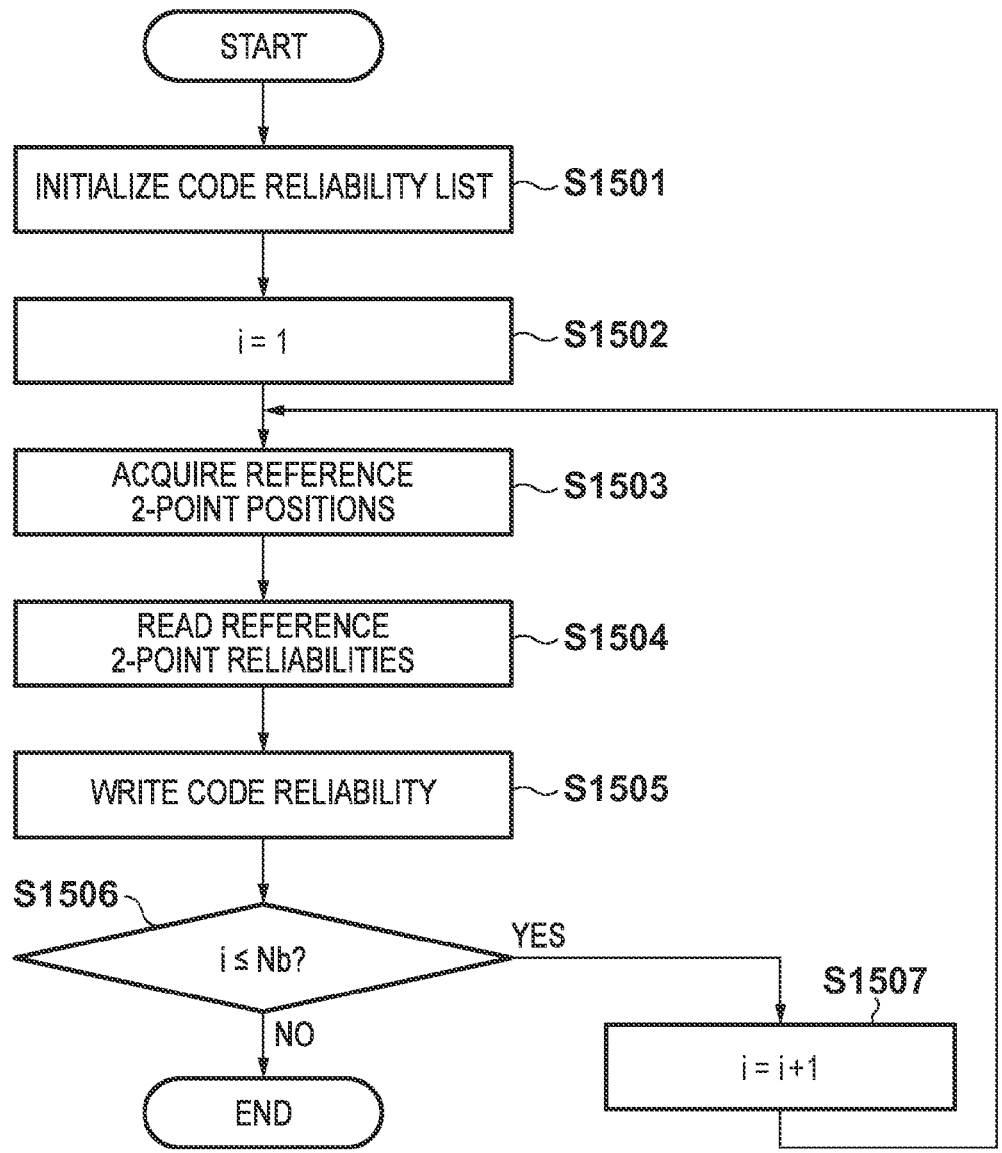
F I G. 15

INFORMATION PROCESSING APPARATUS AND INFORMATION PROCESSING METHOD

BACKGROUND OF THE INVENTION

1. Field of the Invention

The present invention relates to a pattern recognition technique.

2. Description of the Related Art

Conventionally, a method using a set (ensemble) of classification trees has been proposed. This is a technique for attaining higher recognition performance by generating L (L is a constant equal to or larger than 2) classification trees and using all of these trees.

Non-patent literature (Mustafa Ozuysal, Pascal Fua, Vincent Lepetit, "Fast Keypoint Recognition in Ten Lines of Code," cvpr, pp. 1-8, 2007 IEEE Conference on Computer Vision and Pattern Recognition, 2007) has disclosed an example in which the method using the ensemble of classification trees to a computer vision, and the disclosed method is as follows.

Initially, one registered image undergoes slight deformations and noise additions to generate variation images of the registered image. That is, a plurality of variation images are generated for the registered image of one type.

Next, N reference point pairs each indicating two reference point positions on an image are generated (to be referred to as a reference point pair sequence hereinafter). Image luminance values in the reference point pair sequence are compared, and a comparison result sequence is expressed by a bit sequence of 0/1, thereby calculating an N-bit binary code from one image and one reference point pair sequence.

Then, N-bit binary codes are respectively calculated for the variation images, as described above, and probabilities with the registered image type corresponding to the binary codes are learned. This corresponds to one classification tree. Such learning using N-bit binary codes are executed while changing the reference point pair sequence L times. That is, L classification trees are generated.

In a detection mode, an N-bit binary code is calculated from an input image according to the positions of the N reference point pairs set in a learning mode. This calculation is executed for all the L different reference point pair sequences which are set in the learning mode. A product of probabilities of a registered image associated with the obtained L binary codes is calculated, and a registered image type with the highest probability is selected as a detection result.

According to this method, the processing in the detection mode can be practiced by a high-speed method including binary code conversion by comparison of pixel values of reference point pairs of an input image and dictionary table lookup using binary codes. For this reason, compared to classic recognition processing using classification trees, the processing can be speeded up very much. Also, the literature includes a report indicating that the recognition accuracy is sufficiently high.

According to the conventional technique, the following problems are posed. That is, a plurality of variation images have to be generated for one registered image for the purpose of learning, and a complicated operation sequence and heavy processing load are required in the learning mode. Also, when the number of variations is increased, the size of learning result information (dictionary) increases, and overloads a memory. Since the dictionary size increases according to a product of the number of types of images to be registered and the number of variations, a problem is especially serious when the number of types of registered image is large.

When the number of variations is limited to maintain a small dictionary size, detection performance lowers since learning has to be made using only a smaller number of learning images, thus posing another problem. For example, a feature amount as a pixel comparison result of two points of a reference point pair readily changes depending on illumination fluctuations, orientation fluctuations, and noise. Therefore, in order to attain robust recognition, a sufficiently large number of variation images have to be learned for one pattern type, resulting in an increase in dictionary size.

SUMMARY OF THE INVENTION

The present invention has been made in consideration of the aforementioned problems, and provides a technique which can improve robustness of recognition processing without generating a large number of variations for a learning pattern in processing in a learning mode.

According to the first aspect of the present invention, an information processing apparatus comprising: an encoding unit configured to encode an input pattern to a code including a plurality of bits; a calculation unit configured to calculate reliabilities for respective bits of the code; a generation unit configured to generate similar codes each similar to the code based on the reliabilities; and a recognition unit configured to recognize the input pattern based on the code encoded by the encoding unit and the similar codes generated by the generation unit.

According to the second aspect of the present invention, an information processing method comprising: an encoding step of encoding an input pattern to a code including a plurality of bits; a calculation step of calculating reliabilities for respective bits of the code; a generation step of generating similar codes each similar to the code based on the reliabilities; and a recognition step of recognizing the input pattern based on the code encoded in the encoding step and the similar codes generated in the generation step.

Further features of the present invention will become apparent from the following description of exemplary embodiments with reference to the attached drawings.

BRIEF DESCRIPTION OF THE DRAWINGS

FIG. 3 shows an example of the configuration of a reference 2-point position list 120;

FIG. 4 shows an example of the configuration of a code/type correspondence table 122;

FIG. 6 shows an example of the configuration of a dictionary 114;

FIG. 12 shows an example of the configuration of a reliability 128;

FIG. 13 shows an example of the configuration of a recognition result list 127;

FIG. 15 is a flowchart of processing to be executed by a reliability calculation unit 119.

DESCRIPTION OF THE EMBODIMENTS

Embodiments of the present invention will be described hereinafter with reference to the accompanying drawings. Note that an embodiment to be described hereinafter is an example when the present invention is carried out practically, and is one of practical embodiments of the arrangements described in the scope of the claims.

First Embodiment

An example of the arrangement of a pattern recognition apparatus according to this embodiment, which functions as an information processing apparatus, will be described below with reference to the block diagram shown in FIG. 1. Note that the arrangement shown in FIG. 1 is merely an example of the arrangement required to implement respective processes to be described hereinafter.

A CPU 101 executes operation control of the overall pattern recognition apparatus by executing processing using computer programs and data stored in memories 105 and 106, and executes respective processes to be described as those which are to be implemented by the pattern recognition apparatus.

Figure 1:
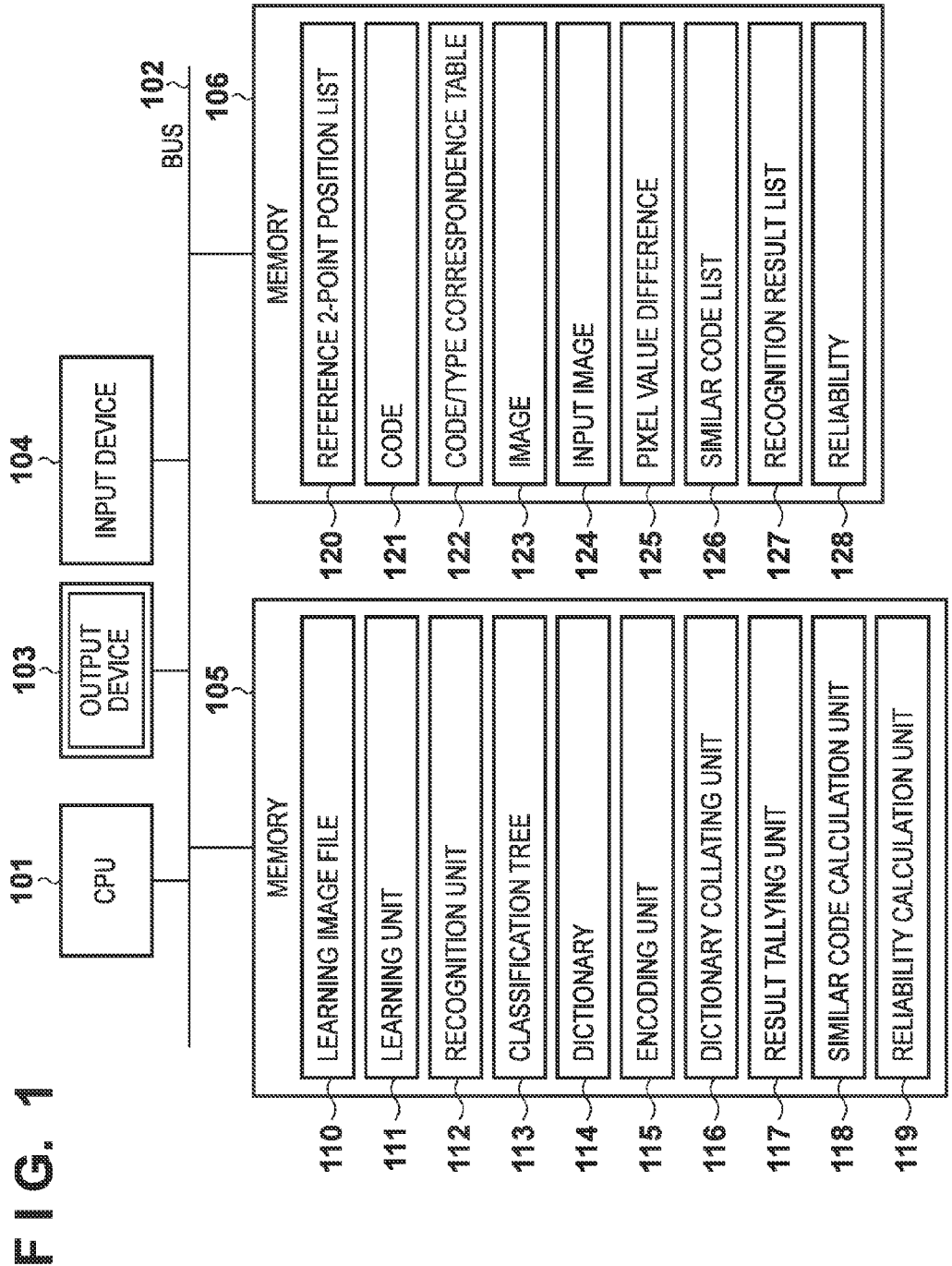
FIG. 1 is a block diagram showing an example of the arrangement of a pattern recognition apparatus.

An output device 103 is used to output a processing result of the pattern recognition apparatus, and is a display device including a CRT, liquid crystal panel, or the like, as shown in FIG. 1, but other devices may be used. For example, the output device 103 may be a device for outputting the processing result to an external apparatus via a network such as a LAN and the Internet.

An input device 104 includes a keyboard, mouse, and the like, and can input various instructions to the CPU 101 when it is operated by the user. Note that when the output device 103 is a display device, the output device 103 and input device 104 may be integrated to form a touch panel screen. Also, the input device 104 may include an image capturing device required to acquire various images to be described later.

The memories 105 and 106 store various computer programs and data to be described later. Note that the memories 105 and 106 may be independent memories or may be independent memory areas in a single memory.

The memory 105 stores a learning image file 110. This learning image file 110 stores a plurality of patterns (images) as recognition targets or a plurality of feature amount images (edge intensity maps and the like) obtained by applying various kinds of feature extraction processing such as edge extraction processing, edge emphasis processing, and the like to images. The following description will be given under the assumption that the learning image file 110 stores one image per type of a pattern as a recognition target for the sake of simplicity. Note that this embodiment has the scope of allowing robust detection even when the number of variations of a pattern to be learned is small, but it is applicable even for a plurality of variation images per pattern type.

Each image in the learning image file 110 is associated with information indicating a type (pattern type) of that image. Various associating methods are available, and any of these methods can be adopted. The following description will be given under the assumption that, for example, identifiers as unique serial numbers starting from "1" express types of images, and that identifier is used as an file name of a corresponding image to associate that image with the pattern type. For example, assume that a file of an image which represents a pattern having a pattern type identifier=000001 is stored to have a file name "000001.bmp".

Contents stored in the memories 105 and 106 other than the learning image file 110 will be touched in the following description, and respective units to be enumerated below are stored in the memory 105 as computer programs:

a learning unit 111;
a recognition unit 112;
an encoding unit 115;
a dictionary collating unit 116;
a result tallying unit 117;
a similar code calculation unit 118; and
a reliability calculation unit 119.

In the following description, these units will be explained as main bodies of processes. However, in practice, the CPU 101 executes computer programs corresponding to these units to execute respective processes to be described later.

Also, the contents stored in the memories 105 and 106 other than these units are stored as data, files, and variables. Of course, respective data, files, and variables may be integrated as needed or may be stored as independent ones. The same applies to the computer programs.

Note that the CPU 101, output device 103, input device 104, and memories 105 and 106 are connected to a bus 102, and can communicate with each other via this bus 102.

Details of pattern recognition processing according to this embodiment will be described below. A pattern recognition method by machine learning includes two processes, that is, a learning process for learning patterns, and a recognition process for recognizing an input new pattern. The learning process will be described first, and the recognition process will then be described.

<Learning Processing>

Learning processing to be executed by the pattern recognition apparatus according to this embodiment will be described below with reference to FIG. 2 which shows the flowchart of that processing. In the following description using FIG. 2, a process for generating a classification tree 113 by learning one classification tree will be explained for the sake of simplicity. This processing is a principal part of a sequence of the learning processing. As will be described later, the learning unit 111 repeats the classification tree generation sequence described using FIG. 2 a plurality of times to generate a plurality of classification trees, and integrates the plurality of generated classification trees to generate a dictionary 114. Details of processing for integrating the plurality of classification tree to obtain one dictionary will be described later.

In step S201, the learning unit 111 sets the number Nid of types of patterns to be recognized (the number of images used in the flowchart shown in FIG. 2) and the number (prescribed number) Nb of bits of encoding. As the setting method, for example, the number of types and the number of bits which are input by the user by operating the input device 104 may be set in variables Nid and Nb, or predetermined values may be set in the variables Nid and Nb. Note that the number Nb of bits is desirably set to be a value which allows pattern to be encoded by the following method to be identifiable from each other, that is, which allows patterns of different types to be expressed by different codes.

In step S202, the learning unit 111 sets a code 121 as a bit sequence of Nb bits in the memory 106. Assume that respective bit values of Nb bits included in this code 121 are initialized to a predetermined value (for example, 0). The learning unit 111 sets a code/type correspondence table 122 as a table including Nid×2 elements in the memory 106. Assume that respective elements in this table are initialized to an appropriate value.

In step S203, the learning unit 111 generates Nb pairs each including two points of coordinate positions (reference point positions) to be set on an image, and registers the generated Nb pairs in the memory 106 as a reference 2-point position list 120. The generation method of the Nb pairs is not limited to a specific method (these pairs may be generated according to a given method or randomly). For example, the method disclosed in non-patent literature 1 may be adopted.

FIG. 3 shows an example of the configuration of the reference 2-point position list 120. In FIG. 3, a pair of two coordinate positions (x1(1), y1(1)) and (x2(1), y2(1)) is registered as the first pair in the reference 2-point position list 120. Also, a pair (x1(2), y2(2)) and (x2(2), y2(2)) is registered as the second pair. In this manner, the pair (x1(1), y1(1)) and (x2(1), y2(1)) to a pair (x1(Nb), y1(Nb)) and (x2(Nb), y2(Nb)), that is, Nb pairs are registered in the reference 2-point position list 120.

In step S204, the learning unit 111 initializes a variable id as that which represents a type of a pattern to be learned to 1. The learning unit 111 determines in step S205 whether or not the value of the variable id is equal to or smaller than the value Nid. As a result of this determination process, if the value of the variable id is equal to or smaller than the value Nid, the process advances to step S206; otherwise, the process advances to step S210. In step S210, the learning unit 111 generates the classification tree 113, and stores it in the memory 105. Details of the processing in step S210 will be described later.

On the other hand, in step S206, the learning unit 111 reads out an image having the value of the variable id as a file name from the learning image file 110, and stores the readout image in the memory 106 as an image 123. For example, if the value of the variable id is "1", the learning unit 111 reads out an image having a file name "000001.bmp" from the learning image file 110, and stores the readout image in the memory 106 as the image 123.

In step S207, the encoding unit 115 encodes the image 123 using the reference 2-point position list 120 stored in the memory 106, and stores the encoding result in the memory 106 as a code 121. As described above, the code 121 is a bit sequence of Nb bits.

Details of the processing in step S207 will be described below with reference to the flowchart shown in FIG. 8. Assume that the encoding unit 115 can access Nb (the number of bits to be encoded) in FIG. 2. Nb may be passed as an argument of processing upon execution of the processing of the encoding unit 115.

In step S801, the encoding unit 115 initializes a value of a variable b which represents a bit position of a bit to be encoded to 1. In step S802, the encoding unit 115 reads out a pair (x1(b), y1(b)) and (x2(b), y2(b)) from the reference 2-point position list 120. Then, the encoding unit 115 acquires a pixel value L1 of a pixel at a coordinate position (x1(b), y1(b)) and a pixel value L2 of a pixel at a coordinate position (x2(b), y2(b)) on the image 123. When a pixel value L at a pixel position (x, y) on the image 123 (file name=id) is described as L=IMG(id)[x, y], the pixel values L1 and L2 are respectively expressed by:

$$L1 = IMG(id)[x1(b), y1(b)]$$

$$L2 = IMG(id)[x2(b), y2(b)]$$

In step S803, the encoding unit 115 calculates a bit value bit(b) of a b-th bit of the code 121 by calculating, using the pixel values L1 and L2 acquired in step S802:

$$\text{bit}(b) = 1 \text{(when } L1 - L2 > 0)$$
$$= 0 \text{(when } L1 - L2 \leq 0)$$

In step S804, the encoding unit 115 updates the bit value of the b-th bit of respective bits included in the code 121 set in the memory 106 to the value bit(b).

In step S805, the encoding unit 115 calculates a value |L1−L2|, and stores the calculated value in a b-th sequence element in a pixel value difference 125 as a sequence having Nb sequence elements. As shown in FIG. 1, this pixel value difference 125 is stored in the memory 106.

In step S806, the encoding unit 115 increments the value of the variable b by 1. The encoding unit 115 determines in step S807 if b≤Nb. As a result of this determination process, if b≤Nb, the process returns to step S802; if b>Nb, the process advances to step S208 in FIG. 2.

Figure 8:
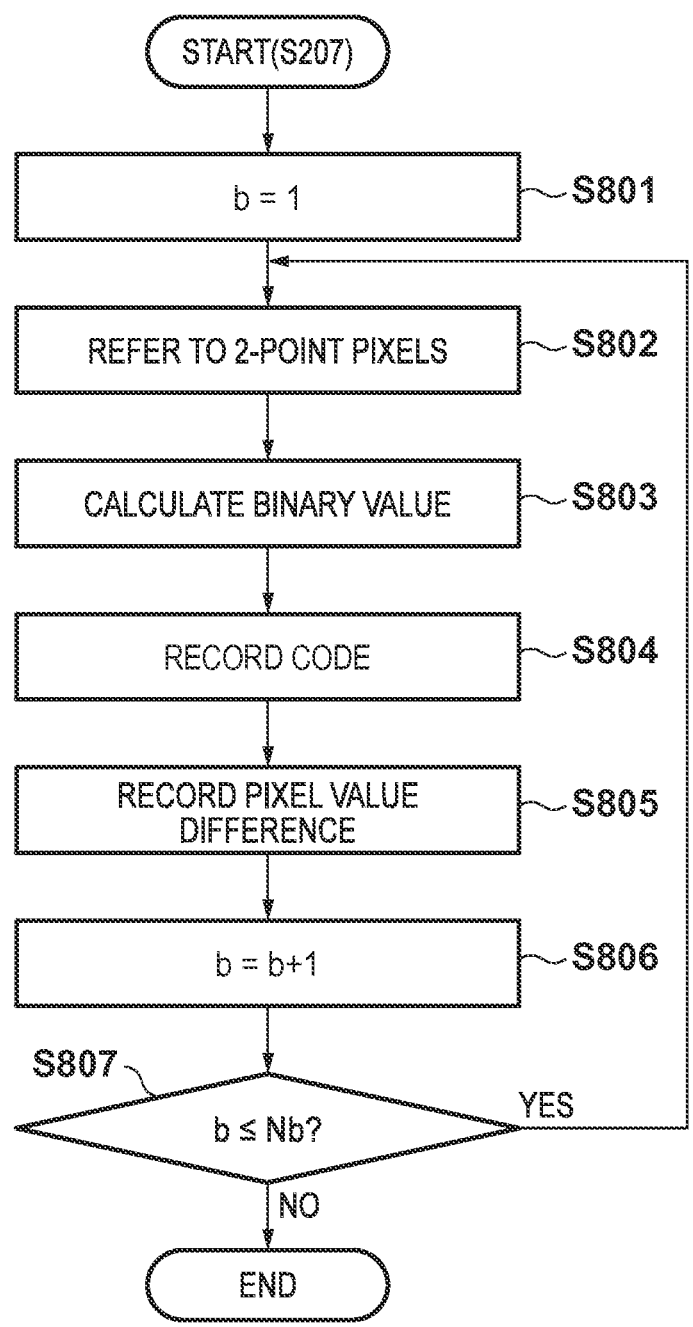
FIG. 8 is a flowchart showing details of processing in step S207.

That is, by executing the processing according to the flowchart shown in FIG. 8, the code 121 as a bit sequence of Nb bits and the pixel value difference 125 having Nb sequence elements can be completed from the image 123.

That is, Nb (Nb is a natural number equal to or larger than 2) pairs each including two pixels are set on an image, and a bit value indicating the magnitude relation between luminance value of pixels in each of the Nb pairs is calculated, thereby calculating a bit sequence including Nb bits as the code 121. The b-th sequence element in the pixel value difference 125 stores the value |L1−L2| corresponding to the b-th bit in the code 121.

Referring back to FIG. 2, in step S208, the learning unit 111 registers the value of the variable id and code 121 in the code/type correspondence table 122 in association with each other. FIG. 4 shows an example of the configuration of the code/type correspondence table 122. The code 121 is registered as a binary code 401, and the value of the variable id is registered as a pattern identifier 402. As shown in FIG. 4, a binary code 401="10010110" is obtained from an image having a pattern identifier 402="000002". Sets of binary codes and pattern identifiers are registered in the code/type correspondence table 122 as many as the number of images, that is, the number Nid of types of patterns to be recognized. FIG. 4 describes the example of Nb=8.

In step S209, the learning unit 111 increments the value of the variable id by 1. Then, the process advances to step S205. In this manner, the code/type correspondence table 122 in which sets of pattern identifiers and binary codes corresponding to respective images are registered is completed.

The processing in step S210 will be described below. In step S210, the classification tree 113 is configured using the reference 2-point position list 120 exemplified in FIG. 3 and the code/type correspondence table 122 exemplified in FIG. 4, and is stored in the memory 105.

Figure 5:
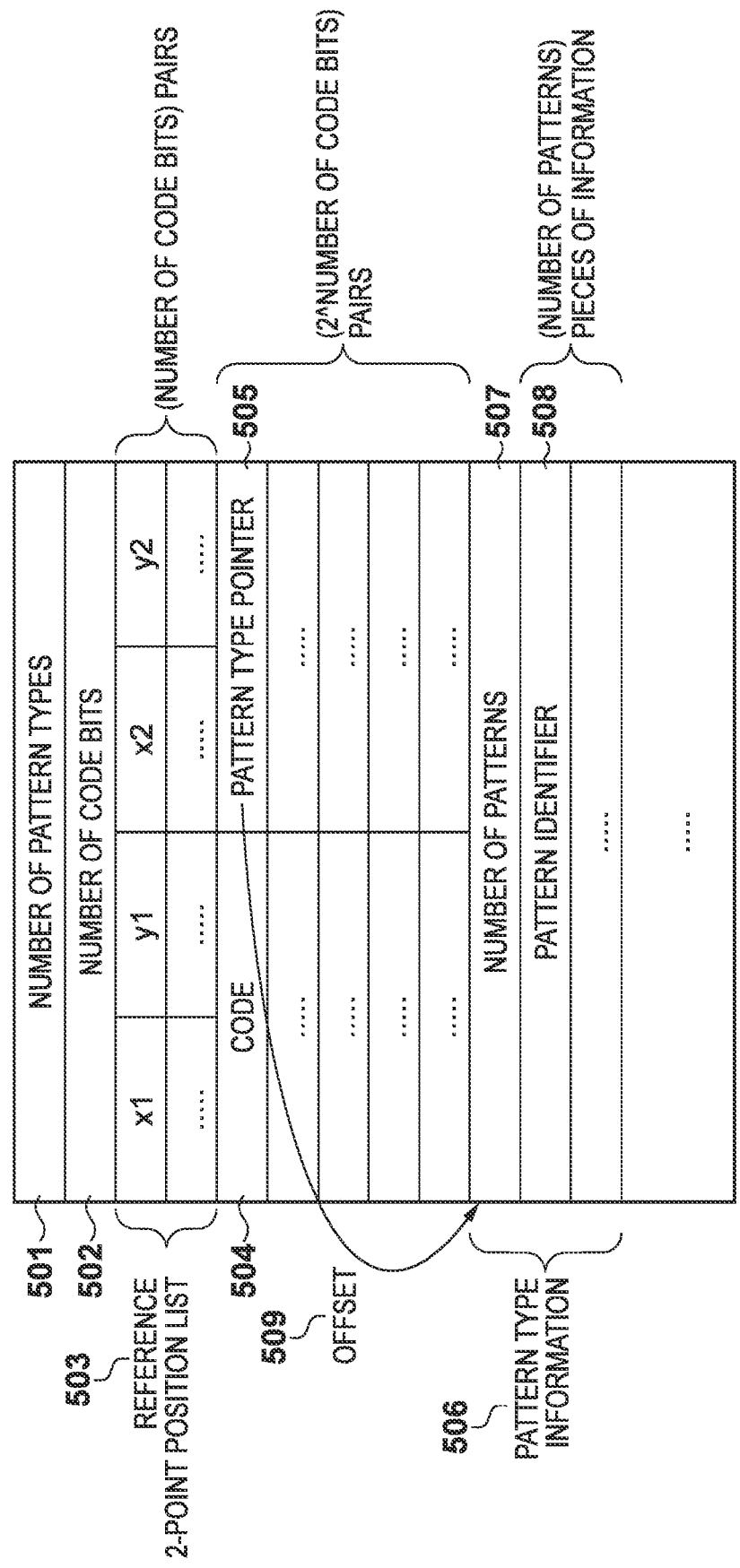
FIG. 5 shows an example of the configuration of a classification tree 113.

FIG. 5 shows an example of the configuration of the classification tree 113. In start fields of the classification tree 113, the number of pattern types 501, the number of code bits 502, and a reference 2-point position list 503 are stored, and they respectively correspond to the aforementioned Nid, Nb, and reference 2-point position list 120. Note that when the Nid and Nb assume the same value in all classification trees, only one of these two pieces of information need only be stored in the dictionary 114. In FIG. 5, in consideration of a case in which these pieces of information are different for respective classification trees, they are stored in each classification tree.

In subsequent fields, sets of binary bit sequences from 0 to ($2^{Nb}-1$) (codes 504) and pattern type pointers 505 as pointers to pieces of pattern type information 506 corresponding to the binary bit sequences are stored. Since a plurality of pieces of pattern type information are likely to correspond to one code, a correspondence table of one code and pointers to the pattern type information is stored. Since the codes 504 have types as many as the number of types of bit sequences of Nb bits, $2^{Nb}$ sets are stored. Note that the codes 504 are sorted in ascending order.

The pattern type pointer 505 corresponding to the code 504 is an offset 509 indicating a storage location where the pattern type information 506 of an image from which the code 504 is calculated is stored. The pattern type information 506 includes the number of patterns 507 as the number of images from which the codes 504 are calculated, and pattern identifiers 508 of respective images from which the codes 504 are calculated. Since the classification tree 113 has the aforementioned configuration, a list of the plurality of pattern identifiers 508 corresponding to the code 504 can be accessed using that code 504 as a key.

In step S210, the contents of the code/type correspondence table 122 stored in the memory 106 are analyzed to be written out to the pattern type information 506 so as to obtain the aforementioned data structure. Since the correspondence relationship between the codes and pattern types is described in the code/type correspondence table 122 shown in FIG. 4, this processing can be easily executed. Subsequently, pieces of pattern type information 506 as many as the number of pieces of information included in the code/type correspondence table 122 are written out up to the end of data.

During the process of the learning processing, even when all images in the learning image file 110 are encoded, not all possible codes appear, and some codes 504 often do not have corresponding pattern identifiers. In such case, such codes are not registered in fields of the binary code 401 in the code/type correspondence table 122 in the memory 106. In this case, since there is no pattern identifier corresponding to a code, "NULL" is set in a field of the pattern type pointer 505 in FIG. 5 in step S210. With the above processing, the classification tree 113 which has learned the learning image file 110 is recorded in the memory 105.

As described above, the processing described using FIG. 2 is that for learning only one classification tree. The learning unit 111 generates a plurality of classification trees by changing reference point positions to be encoded, and connects the plurality of generated classification trees, thus generating the dictionary. This processing will be described below.

Figure 2:
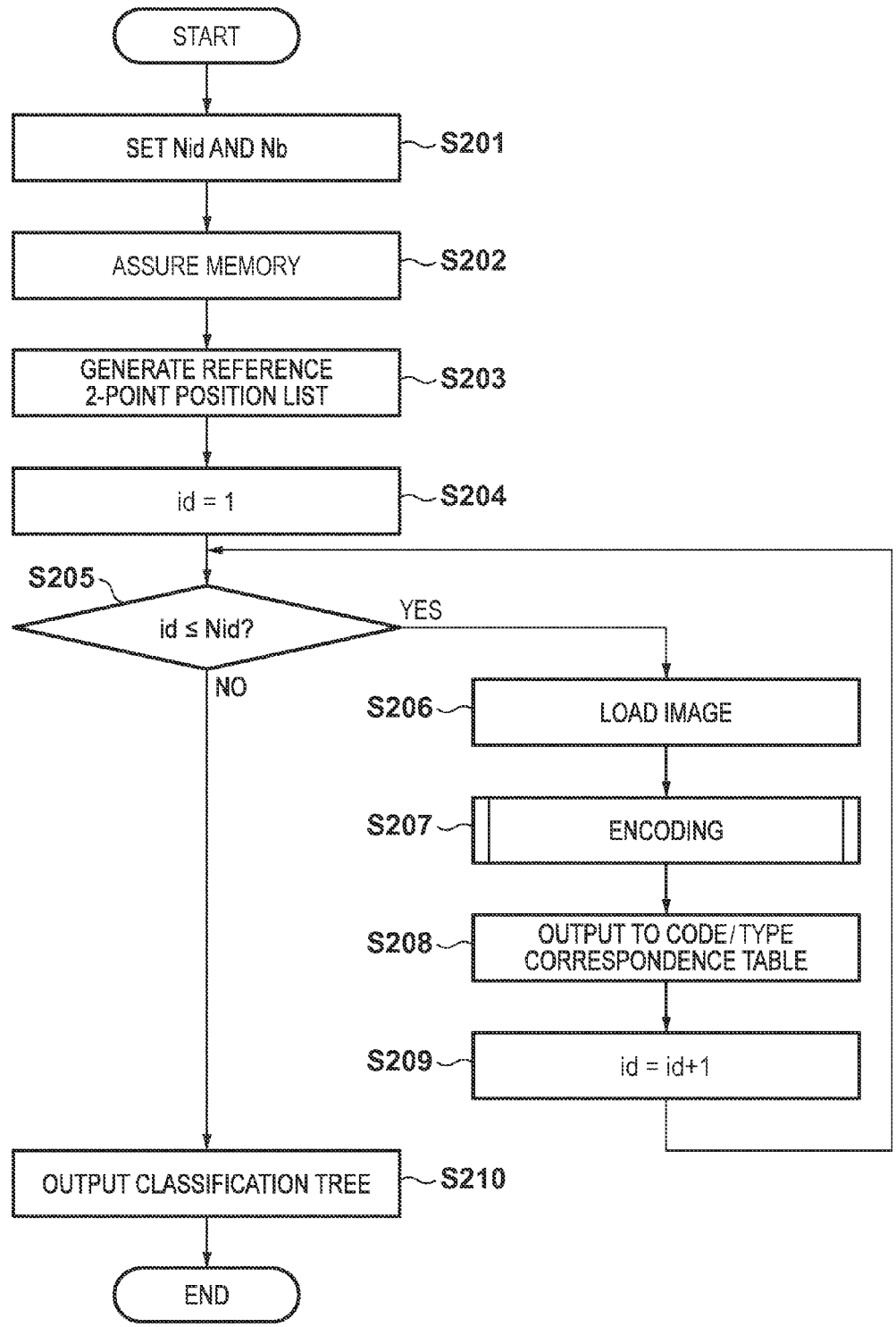
FIG. 2 is a flowchart of learning processing to be executed by the pattern recognition apparatus.

In order to learn a plurality of classification trees, the "processing for generating one classification tree" described using FIG. 2 need only be executed while changing reference point positions every time. Of course, assume that even when generation of the reference 2-point position list 120 in step S203 is repeated a plurality of times, lists having the same contents are not generated. Every time generation of the reference 2-point position list 120 is repeated, the contents of the reference 2-point position list 120 are changed, a different code 121 is calculated for an identical image 123, and a plurality of different classification trees 113 are consequently generated. FIG. 1 shows only one classification tree 113 in the memory 105. However, in order to generate a plurality of classification trees 113, areas required to store the plurality of classification trees 113 have to be assured in the memory 105.

Thus, the learning unit 111 generates one dictionary 114 by connecting the plurality of classification trees 113 generated in this way. FIG. 6 shows an example of the configuration of the dictionary 114. As shown in FIG. 6, the dictionary 114 stores the number of classification trees 601 stored in the dictionary 114, offsets 602 indicating data storage locations of the respective classification trees in the dictionary 114, and the respective classification tree data 603. Assume that when the plurality of classification trees are generated, as described above, a plurality of pieces of classification tree information are stored.

Note that the example of learning the plurality of classification trees have been explained. However, only one classification tree may be learned. That is, the number of classification trees to be learned is not the gist of this embodiment.

The data structure of each classification tree included in the dictionary 114 corresponds to a table having codes 121, which are arranged in ascending order, as keys, and has a feature that a pattern type corresponding to a code can be quickly collated. As a recognition method different from that to be described below, a method of detecting a pattern by expressing an image using a multi-dimensional vector, and collating an input image and dictionary images having a closest distance to the input image in a round-robin manner is known. Compared to such method, the method of this embodiment can execute pattern detection very quickly by only a single table lookup operation.

<Recognition Processing>

Figure 7:
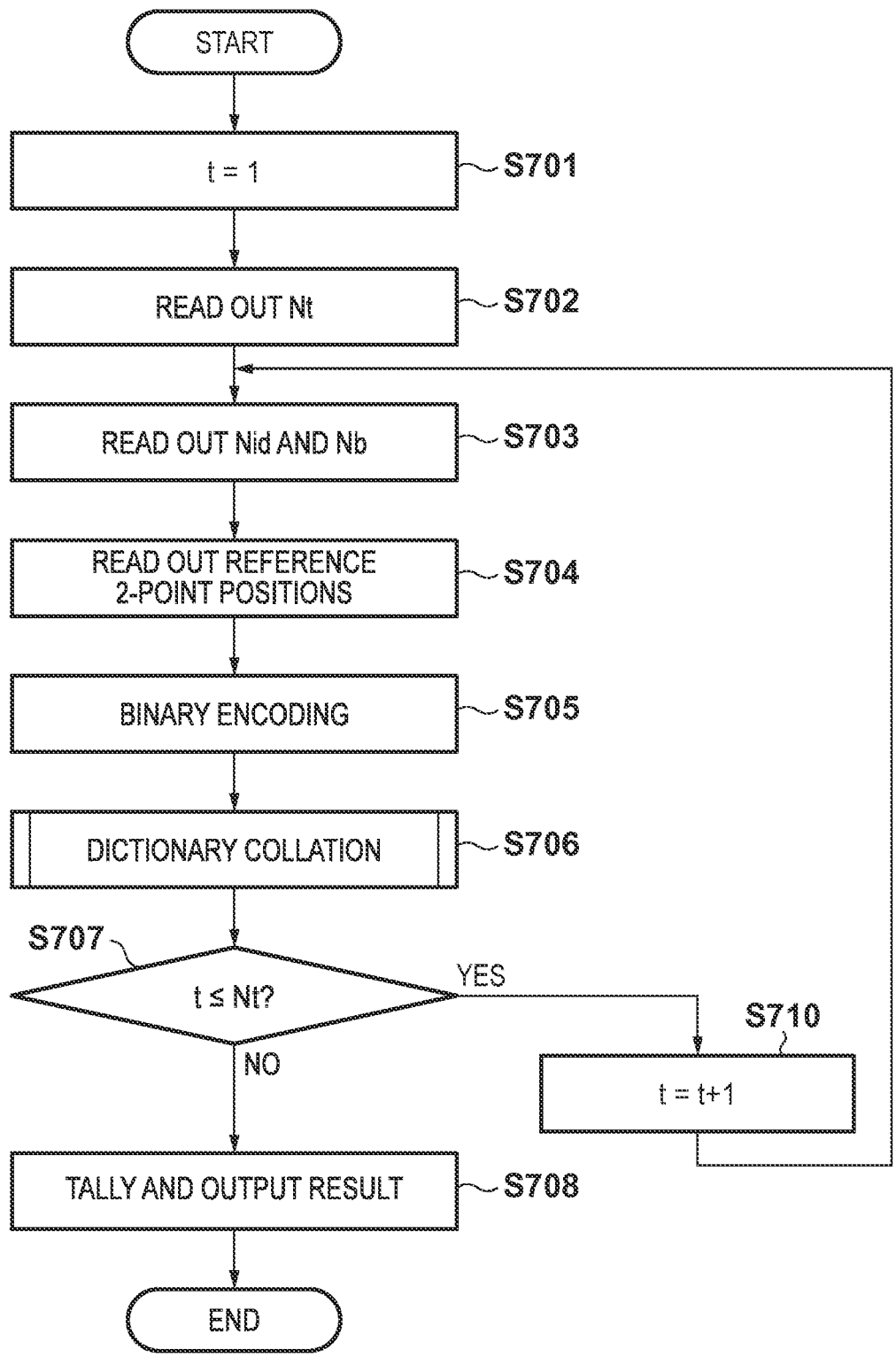
FIG. 7 is a flowchart of recognition processing to be executed by the pattern recognition apparatus.

Recognition processing to be executed by the pattern recognition apparatus according to this embodiment will be described below with reference to FIG. 7 which shows the flowchart of that processing. Assume that the input image 124 is already stored in the memory 106 at the start timing of the processing according to the flowchart shown in FIG. 7. As for this input image 124, an image captured by an image capturing device such as a digital camera may be stored in the memory 106 as the input image 124, and its input mode is not limited to a specific mode.

In step S701, the recognition unit 112 initializes a variable t used as an index for a classification tree to 1. In step S702, the recognition unit 112 reads out the number of classification trees stored in the dictionary 114, which number is stored as the number of classification trees 601 in the dictionary 114, and substitutes the readout number in a variable Nt.

In step S703, the recognition unit 112 accesses a classification tree (classification tree t) stored at a t-th location from a start location of those stored in the dictionary 114 using an offset to that classification tree. Then, the recognition unit 112 reads out the number of pattern types 501 and the number of code bits 502 from the classification tree t, and substitutes them in the variables Nid and Nb, respectively.

In step S704, the recognition unit 112 reads out the reference 2-point position list 503 from the classification tree t, and stores the readout reference 2-point position list 503 in the memory 106 as the reference 2-point position list 120.

In step S705, the encoding unit 115 executes the processing according to the flowchart shown in FIG. 8 for the input image 124 using the reference 2-point position list 120 read out in step S704. With this processing, the code 121 as a bit sequence including Nb bits and the pixel value difference 125 as a sequence having Nb sequence elements are generated from the input image 124.

In step S706, the dictionary collating unit 116 collates the dictionary 114 using the code 121 generated in step S705 as a key. Assume that the variable t is given to the processing in the dictionary collating unit 116 as an argument. Details of the processing in step S706 will be described later.

The recognition unit 112 determines in step S707 whether or not t≤Nt. As a result of this determination process, if t≤Nt, the process advances to step S710; if t>Nt, the process advances to step S708. In step S710, the recognition unit 112 increments the value of the variable t by 1, and the process returns to step S703. On the other hand, in step S708, the result tallying unit 117 tallies and outputs the recognition result. Details of the processing in step S708 will be described later.

Figure 9:
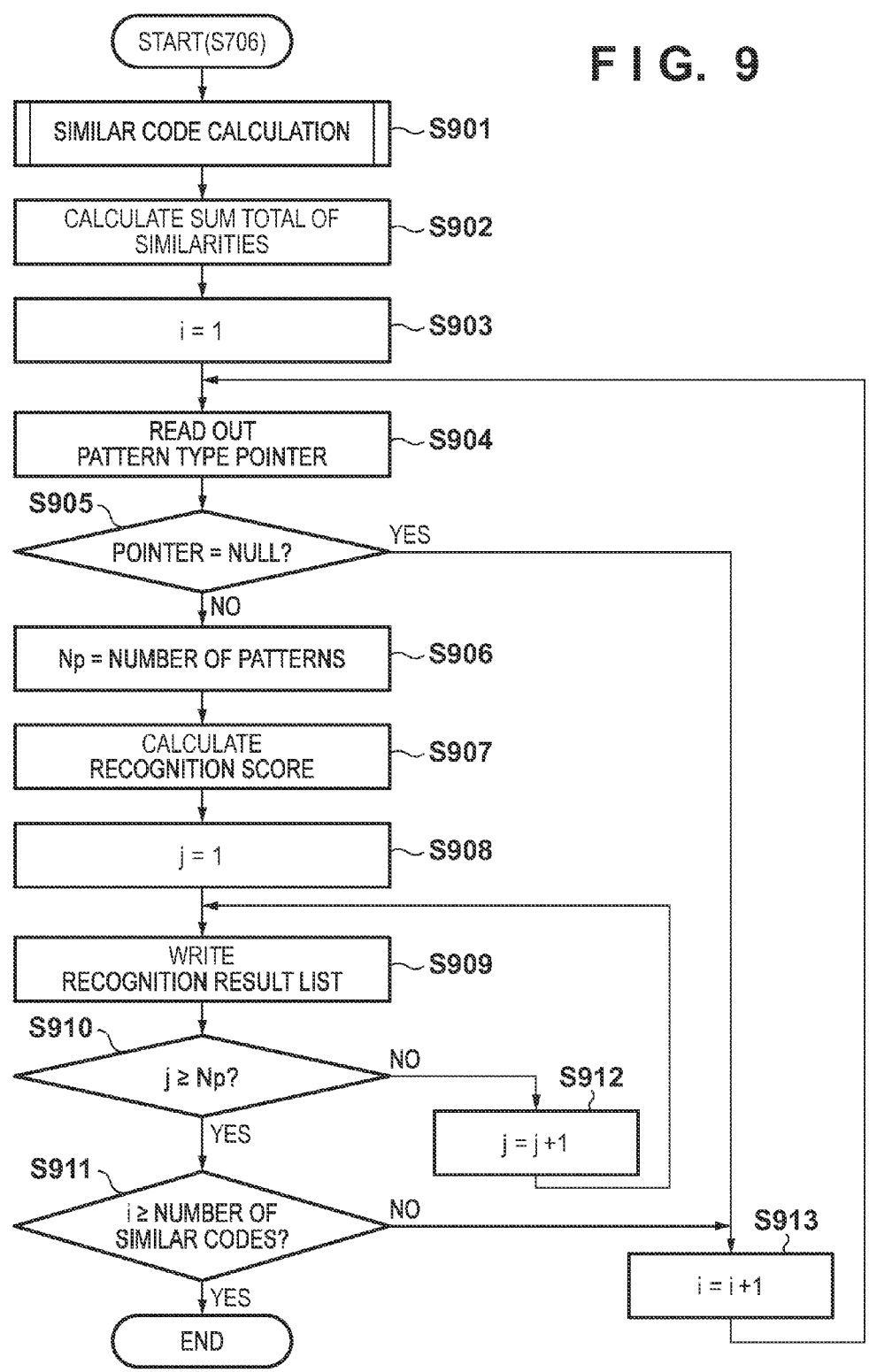
FIG. 9 is a flowchart of processing in step S706.

Details of the processing in step S706 above will be described below with reference to the flowchart shown in FIG. 9. To this processing, the variable t indicating the number of the classification tree is passed from step S706.

Figure 10:
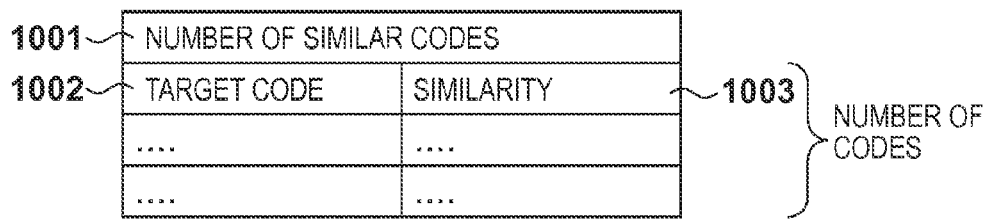
FIG. 10 shows an example of the configuration of a similar code list 126.

In step S901, the similar code calculation unit 118 and reliability calculation unit 119 generate similar codes from the code 121 generated from the input image 124. The similar code calculation unit 118 sets the code 121 and each of generated similar codes as a target code sequence, calculates a similarity between the target code and code 121, and registers the target code, the similarity between the target code and code 121 in a similar code list 126 in association with each other. FIG. 10 shows an example of the configuration of the similar code list 126.

As shown in FIG. 10, the number of target codes (one (code 121)+the number of similar codes) 1001 to be registered in the similar code list 126, target codes 1002, and similarities 1003 between the target codes and code 121 are registered in the similar code list 126. Details of the processing in step S901 will be described later.

In step S902, the CPU 101 calculates a sum total $\Sigma S$ of all similarities registered in the similar code list 126. In step S903, the similar code calculation unit 118 initializes a value of a variable used in the subsequent processing to 1.

In step S904, the CPU 101 specifies, from the codes 504, a code which matches an i-th (for example, i-th from the top) code (code i) in the similar code list 126 with reference to the dictionary 114, and reads out the pattern type pointer 505 corresponding to the specified code.

The CPU 101 determines in step S905 whether or not the pattern type pointer 505 read out in step S904 is "NULL". As a result of this determination process, if the pattern type pointer 505 read out in step S904 is "NULL", the process advances to step S913; otherwise, the process advances to step S906. In step S913, the CPU 101 increments the value of the variable i by 1, and the process returns to step S904.

On the other hand, in step S906, the CPU 101 reads out the number of patterns 507 in the pattern type information 506 pointed by the pattern type pointer 505 read out in step S904, and sets the readout number of patterns 507 in a variable Np.

In step S907, the CPU 101 specifies respective pattern identifiers 508 in the pattern type information 506 pointed by the pattern type pointer 505 read out in step S904, and calculates a recognition score P to be given to the specified pattern identifiers 508. Various calculation methods of the recognition score P are available. For example, the recognition score P may be calculated using:

$P=S/(Np \times \Sigma S)$ where S is the similarities 1003 registered in the similar code list 126 in association with a code i. This calculation method calculates a score based on weights of similarities of a code. $S/\Sigma S$ in this equation executes weighting using similarities, and 1/Np represents a distribution of a score when a plurality of pattern identifiers correspond to one code. Note that this recognition score calculation method is not limited to the method using the above equation, and a recognition score may be calculated using other methods.

For example, an exponential recognition score for similarities may be given. Alternatively, a similarity is not used in recognition score calculation, and P=1.0/Np may always be set. In this case, the above similarities 1003 need not be calculated.

In step S908, the CPU 101 initializes a variable j used in the following processing to 1. In step S909, the CPU 101 registers the recognition score and a j-th pattern identifier of the pattern identifiers 508 in the pattern type information 506 pointed by the pattern type pointer 505 read out in step S904 in a recognition result list 127 in association with each other. FIG. 13 shows an example of the configuration of the recognition result list 127.

As shown in FIG. 13, the recognition result list 127 is required to manage pattern identifiers 1301 and recognition scores 1302 calculated for the pattern identifiers 1301 in association with each other.

In this case, assume that when the j-th pattern identifier is to be registered in the recognition result list 127 in step S909, this j-th pattern identifier has already been registered in the recognition result list 127. In this case, a recognition score has already been registered in association with this j-th pattern identifier, as a matter of course. In this case, in step S909, the recognition score calculated in step S907 is added to the already registered recognition score to update the already registered score. Of course, when the j-th pattern identifier has not been registered in the recognition result list 127 yet, the j-th pattern identifier and recognition score are newly registered in the recognition result list 127.

The CPU 101 determines in step S910 whether or not j≥Np. As a result of this determination process, if j≥Np, the process advances to step S911; if j<Np, the process advances to step S912. In step S912, the CPU 101 increments the value of the variable j by 1, and the process returns to step S909.

The CPU 101 determines in step S911 whether or not the value of the variable i is equal to or larger than the number of codes 1001 registered in the similar code list 126. As a result of this determination process, if the value of the variable i is equal to or larger than the number of codes 1001, the process advances to step S707; otherwise, the process advances to step S913.

The processing in step S901 will be described below. A general description will be given first, and the practical processing sequence will then be described. In the first place, the purpose of the processing in step S901 is as follows.

When a difference between the pixel values L1 and L2 is relatively small, a bit value generated from these pixel values L1 and L2 is likely to change from that value due to slight noise and imaging condition variations. Therefore, the reliability of the bit value generated from the pixel values L1 and L2 which have a relatively small difference is low. Therefore, a code obtained by inverting low-reliability bit values in the code 121 has a high similarity to the code 121.

On the other hand, when a difference between the pixel values L1 and L2 is relatively large, a bit value generated from these pixel values L1 and L2 cannot be easily inverted even by slight variation factors, and such bit value has a high reliability. Therefore, a code obtained by inverting high-reliability bit values in the code 121 has a low similarity to the code 121. Based on such precondition, the processing executed in step S901 will be described below using a practical example shown in FIG. 16.

Figure 16:
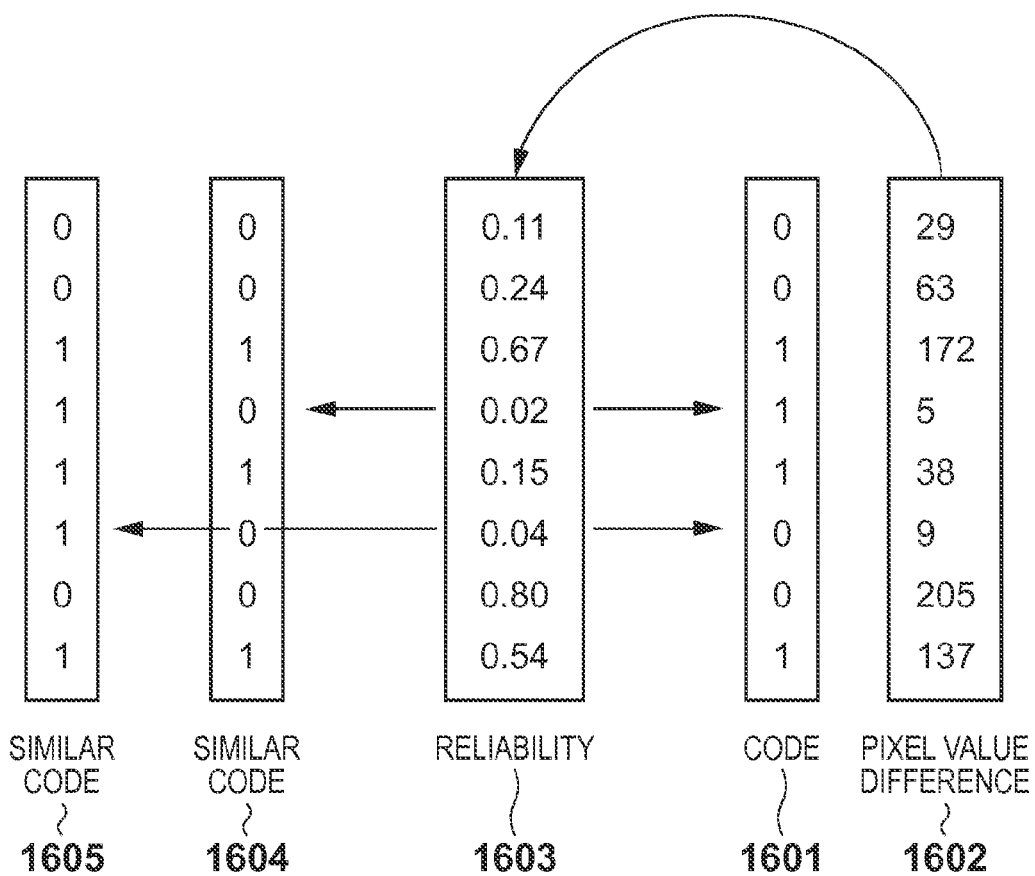
FIG. 16 is a view showing a practical example of processing executed in step S901.

Referring to FIG. 16, a code 1601 is generated from the input image 124, and corresponds to the aforementioned code 121. A pixel value difference 1602 is a sequence which holds |L1−L2|corresponding to each bit of the code 1601, and corresponds to the aforementioned pixel value difference 125.

The reliability calculation unit 119 calculates reliabilities 1603 for respective bits of the code 1601 from respective sequence elements (|L1−L2|) of the pixel value difference 1602. A method of calculating a reliability will be described later.

Then, the similar code calculation unit 118 generates a code obtained by inverting bits having reliabilities lower than a threshold in the code 1601 as a similar code. In FIG. 16, a code obtained by inverting a bit having the lowest reliability in the code 1601 is generated as a similar code 1604. A code obtained by inverting a bit having the second lowest reliability in the code 1601 is generated as a similar code 1605.

Figure 11:
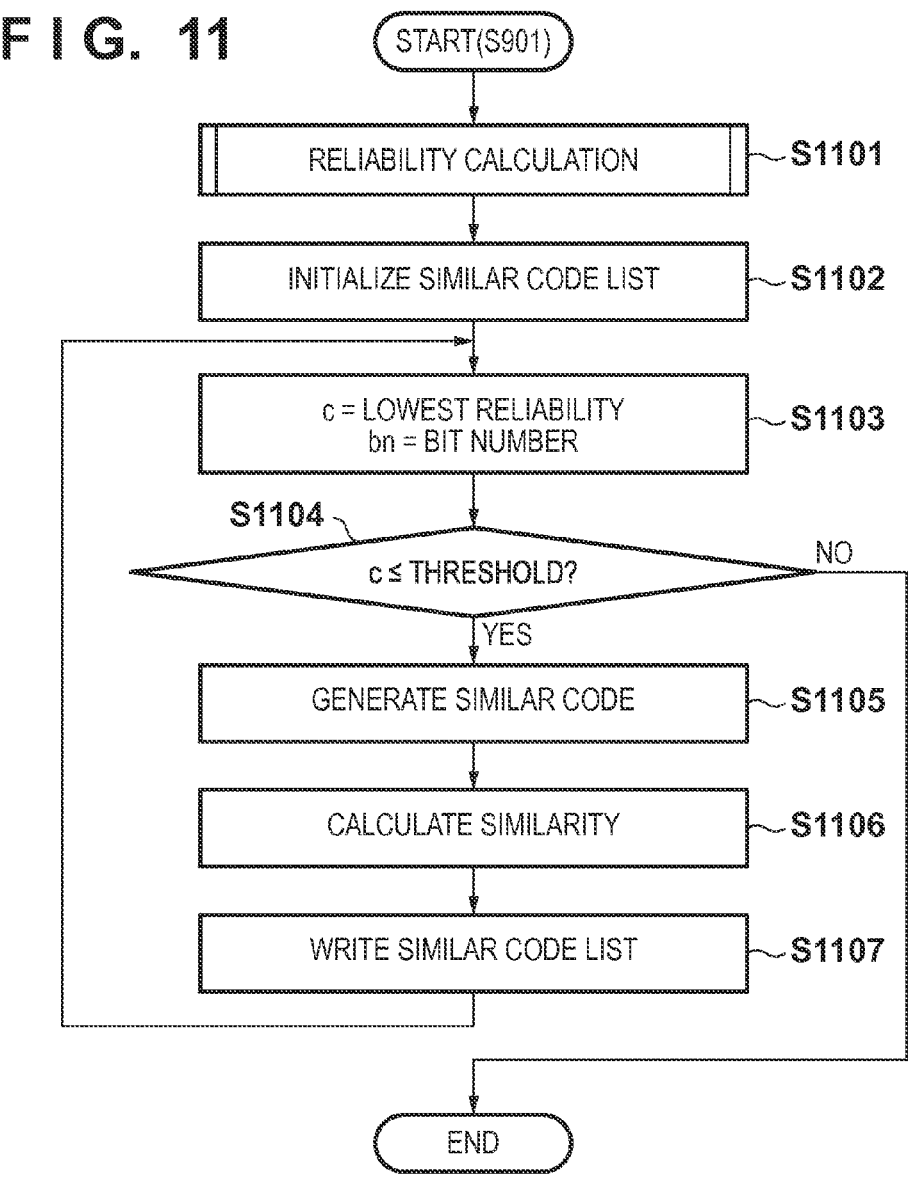
FIG. 11 is a flowchart of processing in step S901.

The processing executed in step S901 will be described below with reference to FIG. 11 which shows the flowchart of that processing. In step S1101, the reliability calculation unit 119 calculates reliabilities for respective bits of the code 121, and stores the reliabilities calculated for the respective bits in the memory 106 as a reliability 128. The reliability indicates a reliable degree of each bit of the code 121 in the recognition processing, as described above. That is, the reliability represents that for a bit having a low reliability, that bit is readily inverted due to noise or for other reasons even in an image of an identical pattern type.

FIG. 12 shows an example of the configuration of the reliability 128. In the reliability 128, bit numbers 1201 indicating respective bit positions of the code 121 and reliability values 1202 for these bit positions are managed in association with each other, as shown in FIG. 12. For example, C1 is registered as a reliability for a bit of a bit number=1, C2 is registered as a reliability for a bit of a bit number=2, and $C_{Nb}$ is registered as a reliability for a bit of a bit number=Nb. Details of calculation processing of a reliability for each bit by the reliability calculation unit 119 will be described later.

In step S1102, the similar code calculation unit 118 initializes the similar code list 126 exemplified in FIG. 10 in the memory 106. With this initialization, the number of codes 1001 is initialized to 1, and the list including sets of target codes 1002 and similarities 1003 is initialized. In this case, a set of the code 121 and similarity "1" is registered in the uppermost field of the list including the sets of target codes 1002 and similarities 1003.

In step S1103, the similar code calculation unit 118 searches the reliabilities C1 to $C_{Nb}$ in the reliability 128, and specifies a lowest reliability Cx as a lowest reliability. Then, a value of the lowest reliability Cx is set in a variable c, and a value of x indicating a bit position of a bit having the lowest reliability Cx is set in a variable bn. Note that the reliability specified as the lowest reliability is excluded from the search targets from the next time. In this case, a lowest reliability is specified from reliabilities other than Cx of the reliabilities C1 to $C_{Nb}$.

The similar code calculation unit 118 determines in step S1104 whether or not c≤a predetermined threshold Cth. As a result of this determination process, if c>Cth, the process advances to step S902; if c≤Cth, the process advances to step S1105.

Note that this threshold Cth assumes a predetermined value. Alternatively, the threshold Cth may be adaptively set depending on a reliability distribution, or an N-th lowest reliability may be set as the threshold Cth. In this step, if the variable c exceeds the threshold Cth, the processing ends. That is, similar code calculation processing which inverts a bit whose reliability exceeds the threshold Cth is not executed. In the subsequent steps, it is guaranteed that the variable c is equal to the threshold Cth at maximum.

In step S1105, the similar code calculation unit 118 generates a code obtained by inverting a bit value of a bn-th bit in the code 121 as a similar code. In step S1106, the similar code calculation unit 118 calculates a similarity between the similar code generated in step S1105 and the code 121. As a method of calculating this similarity, various methods such as a calculation method of exponentially changing a similarity according to the variable c are available. For example, this similarity may be calculated by calculating:

$$S=(Cth-c)/Cth$$

A similarity S calculated by this equation assumes 1 for a similar code obtained by inverting a bit having a reliability=0, and assumes 0 for a similar code obtained by inverting a bit having a reliability=Cth. That is, the similarity S represents that a similar code generated by inverting a bit having a low reliability has a high similarity to an original code. That is, a similar code generated by inverting a bit having a reliability which is equal to the threshold Cth, that is, a highest reliability of those to be processed has a similarity=0. When a certain bit in the code 121 has a low reliability, this means that whether that bit is 0 or 1 is less reliable, and that bit is likely to change to the other result due to a slight imaging condition difference. Therefore, a similar code generated by inverting such bit is evaluated to have a high similarity to an original code. By contrast, a bit value of a bit having a high reliability is unlikely to be inverted even due to slight noise or a slight illumination condition difference. Therefore, a similar code generated by inverting such bit is evaluated to have a low similarity to an original code. As described above, even for an identical difference of 1 bit, a similarity is weighted by the reliability of that bit.

In step S1107, the similar code calculation unit 118 registers the similar code generated in step S1105 and the similarity calculated in step S1106 in the similar code list 126 in the memory 106 in association with each other, and increments the number of codes 1001 by 1. Then, the process returns to step S1103.

Note that in the aforementioned example, one bit having a low reliability is searched for in step S1103, and a similar code is generated by inverting the found bit in step S1105, for the sake of simplicity. However, the similar code generation method need not always use this method.

As another example, the following processing may be used. That is, in step S1103, a value which is a sum of reliabilities of a plurality of bits and is smallest compared to sums of other combinations of a plurality of reliabilities is stored in the variable c, and bit numbers of all bits used to calculate that sum are stored in the variable bn as a list. Then, in step S1105, a similar code is generated by inverting bits corresponding to all the bit numbers stored in the list in the variable bn. In this manner, a similar code can be generated by inverting a plurality of bits. When a similar code is generated by inverting a plurality of bits, a similarity calculation formula is described by:

$$S=(Cth-\Sigma c)/Cth$$

where Σc is a sum of reliabilities of a plurality of bits, and does not exceed the threshold Cth. Furthermore, a similarity may be decreased depending on the number of bits to be inverted. For example, letting kc (kc is a natural number equal to or larger than 1) be the number of bits to be inverted, and W (W is a real number equal to or larger than 0.0 and less than 1.0) be a weighting parameter, the similarity can be calculated by:

$$S=((Cth-\Sigma c)/Cth)\times(W(kc-1))$$

With this equation, even when similarities assume the same value by inverting a plurality of combinations of bits, a similarity corresponding to the smaller number of bits to be inverted is higher.

The processing for calculating a reliability by the reliability calculation unit 119 will be described below. As described above, a bit value of each bit included in the code 121 is decided based on the magnitude relation between the pixel values L1 and L2. At this time, when the pixel values L1 and L2 have the same magnitude relation independently of their difference, the same bit value is set. However, a reliability calculated when L1−L2>0 holds based on a small difference is different from that calculated when L1−L2>0 holds based on a large difference. That is, a bit which assumes a bit value "1" since L1−L2>0 holds based on a slight difference has a low reliability since L1−L2≤0 is likely to hold due to slight illumination/orientation/noise variations, and the bit value is likely to be inverted. Therefore, in this embodiment, assume that a reliability is decided based on the pixel value difference 125.

Figure 14:
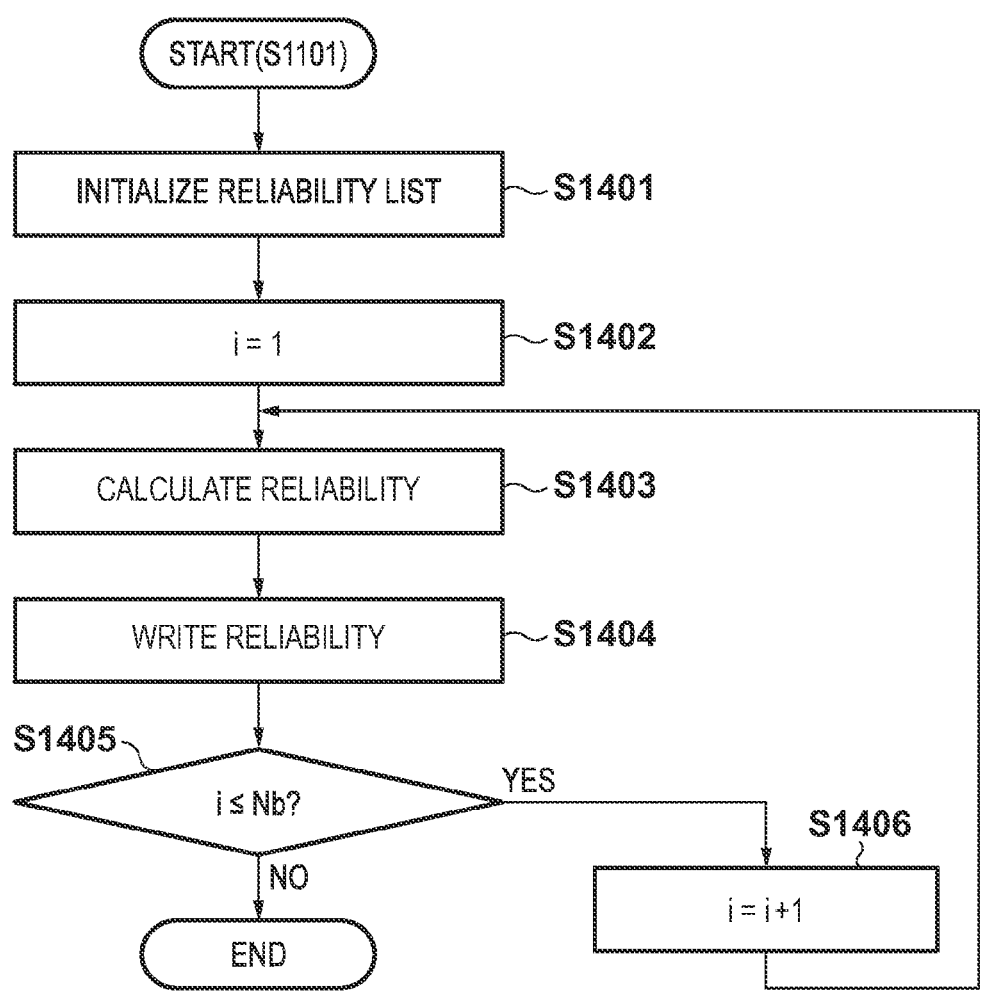
FIG. 14 is a flowchart of processing in step S1101.

The processing for calculating reliabilities for respective bits included in the code 121 and storing the respective calculated reliabilities in the reliability 128 in step S1101 will be described below with reference to FIG. 14 which shows the flowchart of that processing.

In step S1401, the reliability calculation unit 119 initializes the reliability 128 in the memory 106. As described above, as shown in FIG. 12, since this reliability 128 is required to manage the bit numbers 1201 indicating the respective bit positions of the code 121 and reliability values 1202 for these bit positions in association with each other, such sequence is initialized as a reliability list.

In step S1402, the reliability calculation unit 119 initializes a value of a variable i used in the subsequent processing to 1. In step S1403, the reliability calculation unit 119 calculates a reliability Ci for an i-th bit of those included in the code 121 by calculating:

$$Ci = Di/Dmax$$

where Di is a value (pixel value difference) stored in an i-th sequence element in the pixel value difference 125. Dmax is a maximum value which can be assumed as a pixel value difference. The reliability Ci calculated by this equation assumes a value which approaches 0 with decreasing Di, and which approaches 1 with increasing Di. For example, when a pixel value assumes an integer ranging from 0 to 255, Dmax=255, and Ci=0 when Di=0; Ci=1 when Di=255.

In step S1404, the reliability calculation unit 119 registers "i" in an i-th bit number 1201 in the reliability 128, and registers the reliability Ci calculated in step S1403 in an i-th reliability value 1202.

The reliability calculation unit 119 determines in step S1405 whether or not i≤Nb. As a result of this determination process, if i≤Nb, the process advances to step S1406; if i>Nb, the process advances to step S1102. In step S1406, the reliability calculation unit 119 increments the value of the variable i by 1, and the process returns to step S1403.

Note that the reliability calculation method is not limited to a specific method, and what degree each bit of the code 121 of the input image is likely to change due to fluctuation factors such as illumination, orientation, and noise, and what degree each bit is reliable need only be defined. Another example associated with the reliability calculation will also be described in the second embodiment.

Next, the recognition result tallying/output processing executed in step S708 will be described below. In step S708, a pattern identifier to be read out from the recognition result list 127 is decided based on respective recognition scores registered in the recognition result list 127 stored in the memory 106. Then, the decided pattern identifier is read out, and the readout pattern identifier is output.

For example, top N (N is an integer equal to or larger than 1) pattern identifiers in descending order of recognition score may be read out, and may be displayed on the output device 103. Of course, the result to be displayed is not limited to the pattern identifier, and an image itself specified by the pattern identifier may be displayed, and various kinds of information related to that image may be displayed. This N may be a predetermined value, or may be decided according to the recognition score distribution.

As described above, according to this embodiment, similar codes based on reliabilities of respective bits of a code obtained by encoding an input image are calculated in the recognition processing while executing learning using one or a small number of patterns in association with one pattern type. Thus, the robustness of recognition can be improved as an effect.

Note that the arrangement of the information processing apparatus applicable to the pattern recognition apparatus according to this embodiment is merely an example of the following arrangement. Nb (Nb is a natural number equal to or larger than 2) pairs each including two pixels are set on an input image, and a bit value indicating the magnitude relation between pixels in each pair is calculated for each of the Nb pairs, thereby calculating a bit sequence including Nb bits (first calculation).

Then, for each bit included in this bit sequence, a reliability for that bit is calculated from pixel values of two pixels in the pair used to calculate a bit value of that bit (second calculation).

Then, a similar bit sequence is generated by inverting a bit value of a bit according to the reliabilities of respective bits of those included in this bit sequence. The bit sequence calculated from the input image and the similar bit sequence are set as target bit sequences, and a bit sequence which matches the target bit sequence of those which are calculated in advance by the first calculation for each of a plurality of learning images is specified. Then, information associated with a learning image as a generation source of this specified bit is output.

Second Embodiment

In the first embodiment, a luminance image is used as an input image (therefore, in the first embodiment, a pixel value is a luminance value). In this embodiment, a range image is used as an input image. The range image expresses a range from an image capturing device such as a camera to an object to be captured as an image. Many ranging methods required to generate a range image are known, and representative methods include a light-section method, stereo method, and the like.

In each ranging method, a range is measured, and a reliability of a measured range value can be defined for each pixel of the range image. For example, "Japanese Patent No. 02742192, Route Calculation Apparatus, Nippon Telegraph and Telephone Corporation" describes that a reliability of a value can be calculated for each pixel of a range image based on the magnitude of a reception level of reflected light of projected slit light in the light-section method. A reliability of a range value in this embodiment can mean that of a range value described in this literature.

Also, "Japanese Patent No. 03367170, Obstacle Detection Apparatus, TOYOTA CENTRAL LABS., INC." describes that a reliability of a range value can be calculated for each pixel of a range image by checking a correlation state of corresponding small regions between a plurality of images. A reliability of a range value in this embodiment can mean that of a range value described in this literature.

The processing sequence in this embodiment is roughly the same as the first embodiment, except for a point in which a range image is handled as an input image, and a point in which reliability calculation processing by the reliability calculation unit 119 calculates reliabilities for respective bits in the code 121 using those of range values. These two points will be described below.

The point in which an input image is a range image will be described first. A method of generating a range image using a ranging device is conventionally known. Therefore, arbitrary arrangements can be adopted as long as this range image can be input to the memory 106 as the input image 124. For example, a range image transmitted from an external apparatus may be received via a network, and the received range image may be stored in the memory 106 as the input image 124. Alternatively, for example, such ranging device may be added to the arrangement shown in FIG. 1, and a range image generated by this ranging device may be stored in the memory 106.

A range image is used as an image to be handled, but it can be handled in the same manner as the input image 124 used in the first embodiment. Also, the learning image file 110, image 123, and input image 124 shown in FIG. 1 are range images. The processing by the encoding unit 115 is the same as that in the first embodiment, except that a pixel value is a range value.

When a range image is acquired as the input image 124 by the aforementioned conventional technique, a reliability map which associates respective pixels (their pixel values are range values) of the range image with their reliabilities can be generated. The reliability map is expressed as a two-dimensional array which has the same size as the length and width of the range image and includes values as reliabilities of the range values. With this map, if a reference position on the range image can be obtained, the reliability of the range value at that reference position can be obtained. Assume that the reliability map of the range values is generated when the range image is acquired as the input image 124, and is stored in the memory 106.

Processing to be executed by the reliability calculation unit 119 according to this embodiment will be described below with reference to FIG. 15 which shows the flowchart of that processing. Note that in this embodiment, the input image 124 as the range image is already stored in the memory 106 at this time.

In step S1501, the reliability calculation unit 119 initializes the reliability 128 in the memory 106 as in the first embodiment. In step S1502, the reliability calculation unit 119 initializes a value of a variable i used in the subsequent processing to 1. In step S1503, the reliability calculation unit 119 reads out a pair (x1(i), y1(i)) and (x2(i), y2(i)) from the reference 2-point position list 120.

In step S1504, the reliability calculation unit 119 acquires reliabilities at the respective pixel positions (x1(i), y1(i)) and (x2(i), y2(i)) from the reliability map.

In step S1505, the reliability calculation unit 119 registers a lower one of the two reliabilities acquired in step S1504 in an i-th reliability value 1202 in the reliability 128, and also registers "i" in an i-th bit number 1201 in the reliability 128.

Note that a lower one of the two reliabilities is registered in the reliability 128. However, the present invention is not limited to this. For example, a reliability calculated by an arbitrary function including these two reliabilities may be registered in the reliability 128.

When the reliabilities for the range values are obtained as an error distribution with respect to the range values, a probability at which a comparison result of two points is not reversed may be calculated, and may be set as a reliability of that bit in the code 121.

The reliability calculation unit 119 determines in step S1506 whether or not i≤Nb. As a result of this determination process, if i≤Nb, the process advances to step S1507; if i>Nb, the process advances to step S902. In step S1507, the reliability calculation unit 119 increments the value of the variable i by 1, and the process returns to step S1503.

As described above, according to this embodiment, as for input data given with reliabilities of values of an input pattern, reliabilities of respective bits of a code are allowed to be calculated from those of the input data. This embodiment is effective to a case in which the reliabilities of values upon acquisition of the input pattern are known. The arrangements of the first and second embodiments may be selectively used as needed.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-267256 filed Dec. 6, 2011 which is hereby incorporated by reference herein in its entirety.

What is claimed is:

1. An information processing apparatus comprising:
a memory configured to store a computer program; and
a processor configured to execute the computer program stored in the memory to function as:
an encoding unit configured to encode an input pattern to a code including a plurality of bits based on differences between feature amounts on the input pattern;
a calculation unit configured to calculate reliabilities for respective bits of the code based on differences between the feature amounts against the input pattern;
a generation unit configured to generate similar codes each similar to the code based on the reliabilities; and
a recognition unit configured to recognize the input pattern based on the code encoded by said encoding unit and the similar codes generated by said generation unit.

2. The apparatus according to claim 1, wherein said encoding unit sets the prescribed number of pairs each including two pixels on the input pattern, and to encode to the code including bits as many as the prescribed number by calculating bit values indicating magnitude relations between pixel values of pixels in the pairs, and said calculation unit calculates a reliability for each of bits included in the code from pixel values of two pixels in a pair used to calculate a bit value of that bit.

3. The apparatus according to claim 2, wherein said calculation unit calculates, for each bit included in the code obtained from the input pattern, a difference between pixel values of pixels in a pair used to calculate a bit value of that bit as a reliability for that bit.

4. The apparatus according to claim 1, wherein said recognition unit comprises
a specification unit configured to specify a code, from codes obtained by encoding learning patterns by said encoding unit, which matches the code obtained from the input pattern by said encoding unit or one of the similar codes generated by said generation unit; and
an output unit configured to output information associated with a learning pattern as a generation source of the code specified by said specification unit.

5. The apparatus according to claim 4, wherein said specification unit gives a score to a code which matches the code obtained from the input pattern by said encoding unit or one of the similar codes generated by said generation unit among the codes obtained by encoding the learning patterns by said encoding unit;
said output unit outputs information associated with learning patterns as generation sources of one or more codes in descending order of score.

6. The apparatus according to claim 1, wherein said recognition unit calculates similarities between the code generated by said encoding unit and each of the similar codes generated by said generation unit, performs pattern matching using the code generated by said encoding unit and the similar codes generated by said generation unit, and weights a result of the pattern matching with the similarities to recognize the input pattern.

7. An information processing method comprising:
an encoding step of encoding an input pattern to a code including a plurality of bits based on differences between feature amounts on the input pattern;
a calculation step of calculating reliabilities for respective bits of the code based on differences between the feature amounts against the input pattern;
a generation step of generating similar codes each similar to the code based on the reliabilities; and
a recognition step of recognizing the input pattern based on the code encoded in the encoding step and the similar codes generated in the generation step.

8. A non-transitory computer-readable storage medium storing a computer program for controlling a computer to perform respective steps of an information processing method comprising:
an encoding step of encoding an input pattern to a code including a plurality of bits based on differences between feature amounts on the input pattern;
a calculation step of calculating reliabilities for respective bits of the code based on differences between the feature amounts against the input pattern;
a generation step of generating similar codes each similar to the code based on the reliabilities; and
a recognition step of recognizing the input pattern based on the code encoded in the encoding step and the similar codes generated in the generation step.

9. An information processing apparatus comprising:
a memory configured to store a computer program; and
a processor configured to execute the computer program stored in the memory to function as:
an encoding unit configured to encode an input pattern to a code including a plurality of bits;
a calculation unit configured to calculate reliabilities for respective bits of the code;
a generation unit configured to generate similar codes each similar to the code by inverting a bit value of a bit decided according to reliabilities of respective bits of the bits included in the code; and
a recognition unit configured to recognize the input pattern based on the code encoded by said encoding unit and the similar codes generated by said generation unit.

10. The apparatus according to claim 9, wherein said generation unit inverts bit values in turn from bits having lower reliabilities of the bits included in the code obtained from the input pattern, and generates a bit sequence obtained every time the bit value is inverted as the similar code.

11. An information processing method comprising:
encoding an input pattern to a code including a plurality of bits;
calculating reliabilities for respective bits of the code;
generating similar codes each similar to the code by inverting a bit value of a bit decided according to reliabilities of respective bits of the bits included in the code; and
recognizing the input pattern based on the code encoded by said encoding step and the similar codes generated by said generation step.

12. A non-transitory computer-readable storage medium storing a computer program for controlling a computer to perform respective steps of an information processing method comprising:
encoding an input pattern to a code including a plurality of bits;
calculating reliabilities for respective bits of the code;
generating similar codes each similar to the code by inverting a bit value of a bit decided according to reliabilities of respective bits of the bits included in the code; and
recognizing the input pattern based on the code encoded by said encoding step and the similar codes generated by said generation step.

* * * * *